W. G. WAITT.
DRY BATTERY POSTING MACHINE.
APPLICATION FILED MAY 10, 1906.

921,186.

Patented May 11, 1909.
2 SHEETS—SHEET 1.

Witnesses.
E. B. Gilchrist
H. B. Sullivan

Inventor:
Walter G. Waitt
By Thurston Woodward
Attorneys

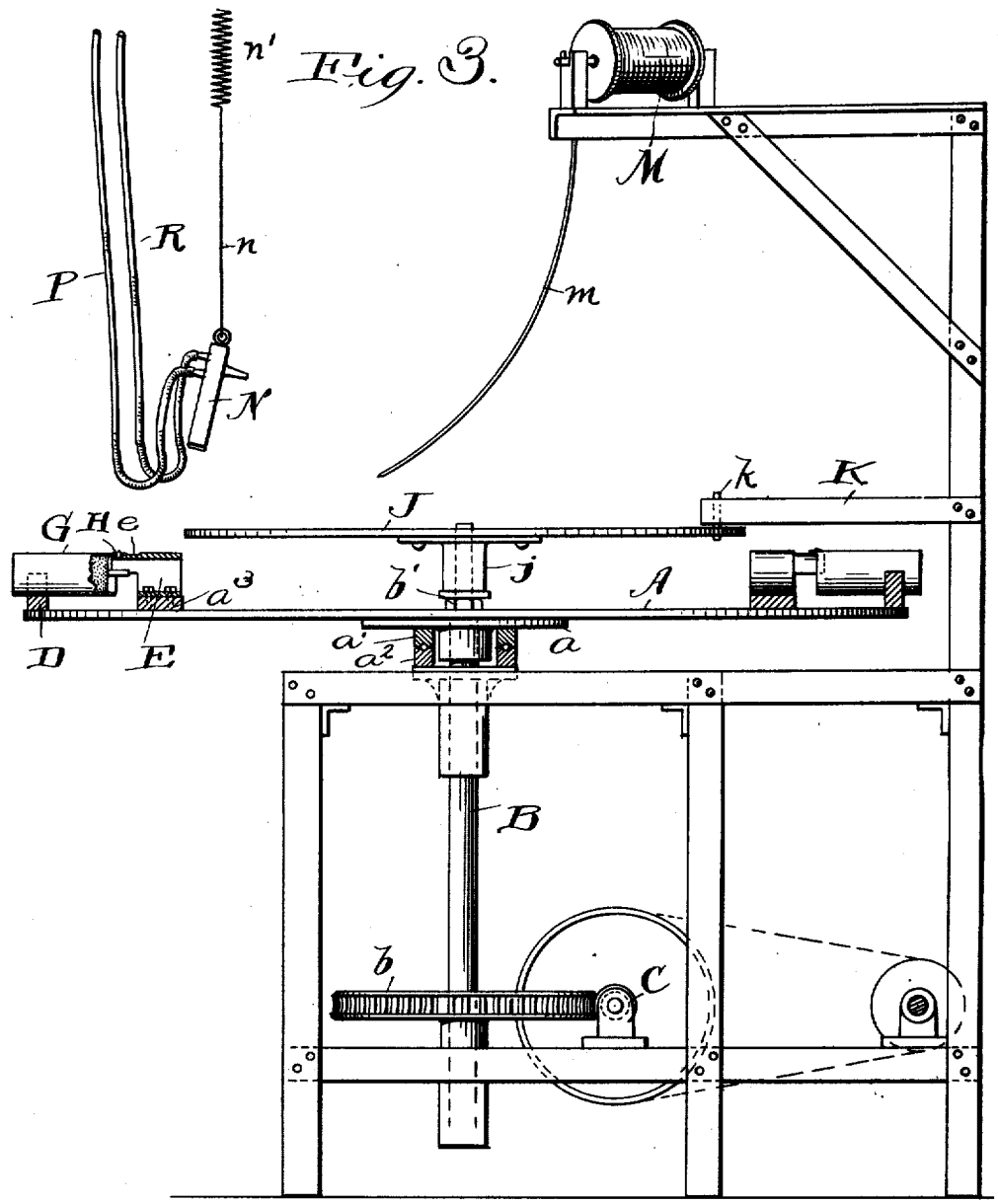

UNITED STATES PATENT OFFICE.

WALTER G. WAITT, OF FREMONT, OHIO, ASSIGNOR TO NATIONAL CARBON COMPANY, OF CLEVELAND, OHIO, A CORPORATION OF NEW JERSEY.

DRY-BATTERY-POSTING MACHINE.

No. 921,186.  Specification of Letters Patent.  Patented May 11, 1909.

Application filed May 10, 1906. Serial No. 316,058.

To all whom it may concern:

Be it known that I, WALTER G. WAITT, a citizen of the United States, residing at Fremont, in the county of Sandusky and State of Ohio, have invented a certain new and useful Improvement in Dry-Battery-Posting Machines, of which the following is a full, clear, and exact description.

The object of this invention is to greatly reduce the cost of securing the binding posts to zinc cups of dry battery cells.

The invention resides in the machine shown which enables the workmen to do this work very much more rapidly than it has heretofore been done; and this machine includes a movable table on which are suitable supports for the battery cells, and conveniently arranged supports for the soldering apparatus, past which the battery cells are carried by the movement of the table.

The invention consists in the construction and combinations of parts hereinafter described and pointed out definitely in the claims.

Figure 1:
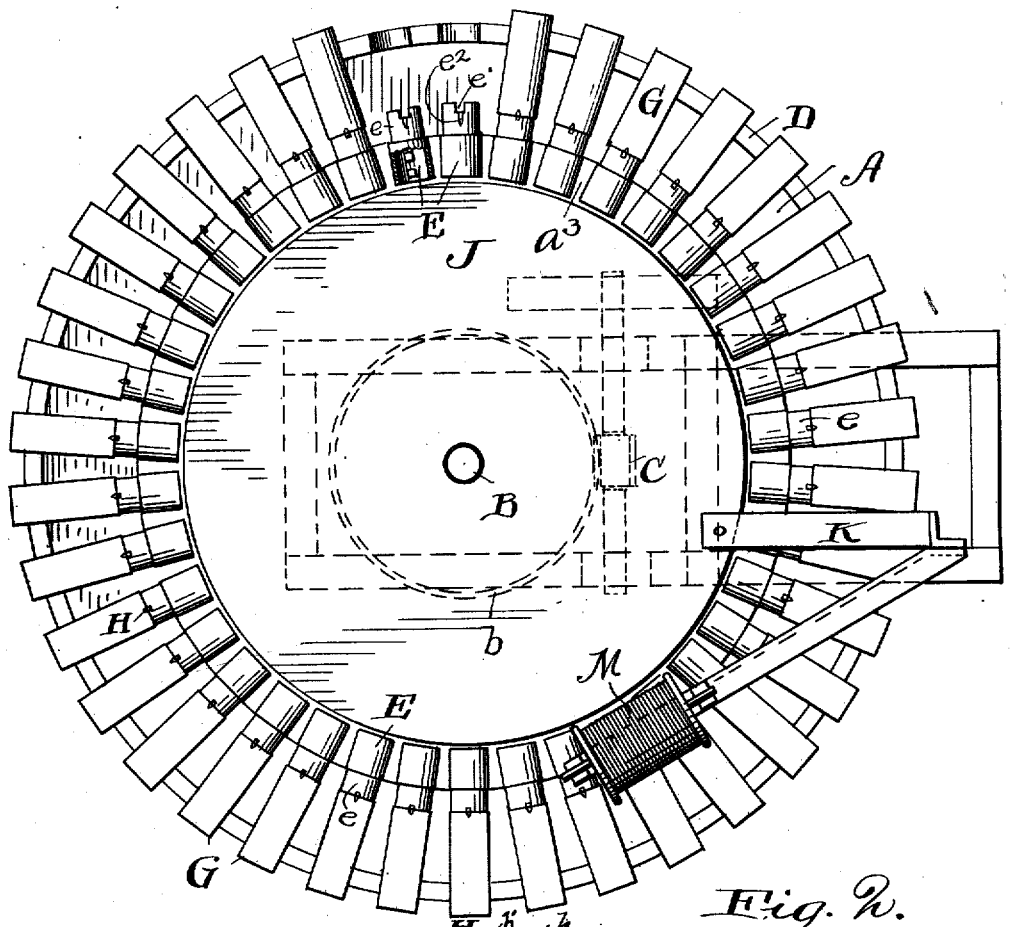
Figure 2:
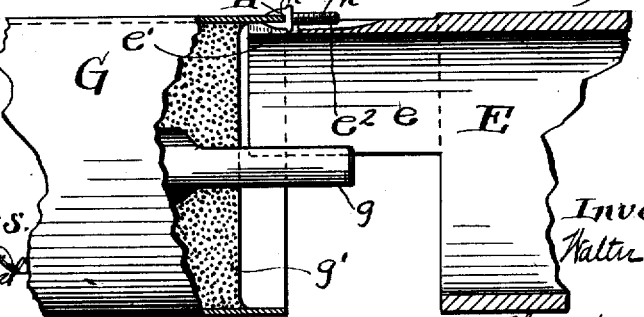

In the drawings Figure 1 is a plan view of the machine. Fig. 2 is an enlarged sectional view of the upper end of a dry battery cell and the support for said end,—the support being in vertical section, and a part of the upper end of the cell being also in vertical section. Fig. 3 is a side elevation of the machine; and Fig. 4 is a detached view of the support for the upper end of the battery cells.

Referring to the parts by letters A represents a table of circular form which is secured to the upper end of a vertical shaft B. This shaft may be driven by the worm wheel $b$ secured to it, and a driven worm C suitably mounted in the frame, in engagement with said wheel. The table A is preferably secured to a plate $a$ which is mounted on ball bearings of any suitable construction,— one of said ball bearings, indicated by $a'$, being attached to the plate $a$ and the other, indicated by $a^2$, being attached to the frame of the machine. Close to the outer edge of this table are a plurality of saddles D; and, associated with each one of these, is a support E, also secured to the table, but nearer the center thereof. This support is of such height that when a battery cell is resting upon the corresponding saddle this support extends into the open end of the cell beneath and in engagement with the upper edge of the zinc cup thereof. It is also in a plane above that which at that time contains the carbon electrode $g$, so as not to touch the same. Specifically, this support is the upper part of a cylindrical tube $e$ which is of approximately the same diameter as the interior of said zinc cup. The cylinder is fixed to the table; and the lower part of its outer end is cut away leaving the support E as described.

The battery cells which this machine is intended to be used with include an outer zinc cup G, a centrally placed carbon element $g$ which projects above the top of said cup, and a filling of depolarizing material $g'$ moistened by an excitant. It is necessary that a binding post be secured to the zinc cup, as well as to the carbon element. The zinc cups are filled, as above described, when the binding posts are attached. The binding posts H have a split head $h'$ adapted to embrace the top edge of the zinc cup, and a screw threaded upwardly extended stem $h$. These binding posts are put upon the edge of the zinc cup before the battery cell is put into the machine. When it is put in, the split head of the binding post lies in a notch $e'$ in the outer edge of the support E, and said support just back of this notch is provided with a radial groove $e^2$ which receives the threaded stem, whereby the binding post is securely held upon the edge of the zinc cup so long as the battery cell is in the machine in the position described.

J represents a fixed table having a sleeve $j$, which embraces the upper end of the shaft B and rests upon a nut $b'$ fixed to said shaft. The table J is prevented from rotating by means of a fixed arm K having a pin $k$ which projects into a hole in said table. This table J is for the purpose of supporting a box containing the binding posts, and a vessel (neither of which are shown) containing the acid used in soldering.

M represents the overhead reel on which soldering wire $m$ is wound, said reel being placed at a position above the table A, so that the operator may conveniently reach this soldering wire as it hangs down from said reel.

N represents the soldering torch, which is supplied with gas and air through the flexible pipes P and R; and is supported by a flexible cord or wire $n$ attached to a depending spring *n'* in a convenient place for the operator to grasp it and direct it toward the binding post.

In using this machine one boy will put the binding posts onto the edge of the zinc cups and will place the battery cells upon the table in the position shown,—that is to say with the lower ends of said cups resting in the saddles D and the upper ends of said cups resting upon the support E with the binding post in the notch *e'* thereof. The operator who solders these binding posts on will be at another position at the table. As the zinc cups slowly moves past him he wipes the binding post and cup with the acid, and then places the end of the soldering wire in proper position, and with the soldering torch melts enough of it for the purpose and allows the same to drop onto the binding post, whereby it is soldered to the zinc cup. When the battery cells are finished so far as this operation is concerned, they are slowly carried away from the soldering operator back to the boy, who removes them from the table and substitutes others. In the method heretofore employed for accomplishing this result, an operator would pick up a cell and put the binding post thereon, then after wiping off the same with the acid, put the cell down in a convenient position and then pick up the solder and soldering tool, then dropping one or both of them, would pick up the complete battery cell and lay it one side. By the use of this machine two boys can solder on more than double the number of binding posts which two soldering operators can do according to the old practice.

Having described my invention, I claim:

1. In a posting machine, the combination of a rotatable table, means for turning it slowly and continuously, a plurality of saddles secured thereon near its outer periphery, a plurality of associated supports also secured thereon but nearer to its axis of rotation, each of said supports being an outwardly projecting arm having a substantially cylindrical top surface, and being of such width that it will enter the open end of the battery cell resting upon the corresponding saddle, and will engage with and conform to the upper edge only of said cell, substantially as specified.

2. In a posting machine, the combination of a rotatable table having a plurality of saddles projecting upward therefrom near its outer edge, and a plurality of associated supports which are substantially cylindrical upon their upper surface and are only of such width as to engage with the upper part of the open end of the battery cells which rest upon the corresponding saddles, each of said supports having in its outer edge a notch *e'* and a groove *e²* which extends inward from said notch, the notch being adapted to receive the head of the binding post, and the groove being fitted to receive the threaded stem of said post, substantially as specified.

3. In a posting machine, the combination of a rotatable table, mechanism for rotating the same slowly and continuously, a plurality of saddles secured upon said table near its outer periphery, a plurality of associated supports adapted to enter the open ends of battery cells resting in said saddles and to engage beneath the upper part of said ends, a fixture extending over the table, a reel mounted upon said fixture, a soldering torch, flexible supply pipes therefor, and a flexible support including a contractile coil spring for normally holding said torch in an inoperative position from which it may be easily moved to an operative position, substantially as specified.

In testimony whereof, I hereunto affix my signature in the presence of two witnesses.

WALTER G. WATT.

Witnesses:
F. J. GIELELL,
W. S. REINECK.